(12) United States Patent
Olsen et al.

(10) Patent No.: US 6,298,843 B1
(45) Date of Patent: Oct. 9, 2001

(54) OUTDOOR COOKING APPARATUS

(76) Inventors: Robert M. Olsen; Steven R. Olsen, both of 606 Main St., Marinette, WI (US) 54143

( * ) Notice: Subject to any disclaimer, the term of this patent is extended or adjusted under 35 U.S.C. 154(b) by 16 days.

(21) Appl. No.: 09/666,920

(22) Filed: Sep. 21, 2000

(51) Int. Cl.[7] .................................................. A47J 33/00
(52) U.S. Cl. ............................................ 126/30; 126/25 A
(58) Field of Search ............................... 126/29, 30, 25 A

(56) References Cited

U.S. PATENT DOCUMENTS

| | | |
|---|---|---|
| D. 344,207 | 2/1994 | Bauman . |
| 4,043,260 | * 8/1977 | LaPour et al. .......................... 126/30 |
| 4,120,280 | * 10/1978 | Iverson et al. .......................... 126/30 |
| 4,269,164 | 5/1981 | Van Grinsven et al. . |
| 4,854,297 | 8/1989 | Shuman . |
| 5,297,534 | 3/1994 | Louden . |
| 5,666,940 | 9/1997 | Kreiter . |
| 5,944,009 | 8/1999 | Scheller . |

* cited by examiner

Primary Examiner—Sara Clarke

(57) ABSTRACT

An outdoor cooking apparatus for providing an outdoor enthusiast with a quick and simple way to cook and grill foods over an open fire. The outdoor cooking apparatus includes an elongate support assembly including a tubular member having a bore extending therethrough with elongate support assembly being adapted to penetrate a ground and to extend thereabove; and also includes a grill support assembly including a cable being adjustably extended through the bore of the tubular member; and further includes a grill assembly including a grill member being suspended above the ground by the cable.

6 Claims, 6 Drawing Sheets

OUTDOOR COOKING APPARATUS

BACKGROUND OF THE INVENTION

1. Field of the Invention

The present invention relates to a portable outdoor cooker and more particularly pertains to a new outdoor cooking apparatus for providing an outdoor enthusiast with a quick and simple way to cook and grill foods over an open fire.

2. Description of the Prior Art

The use of a portable outdoor cooker is known in the prior art. More specifically, a portable outdoor cooker heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,269,164; U.S. Pat. No. 5,944,009; U.S. Pat. No. 5,666,940; U.S. Pat. No. 5,297,534; U.S. Pat. No. 4,854,297; and U.S. Pat. No. Des. 344,207.

While these devices fulfill their respective, particular objectives and requirements, the aforementioned patents do not disclose a new outdoor cooking apparatus. The inventive device includes an elongate support assembly including a tubular member having a bore extending therethrough with elongate support assembly being adapted to penetrate a ground and to extend thereabove; and also includes a grill support assembly including a cable being adjustably extended through the bore of the tubular member; and further includes a grill assembly including a grill member being suspended above the ground by the cable.

In these respects, the outdoor cooking apparatus according to the present invention substantially departs from the conventional concepts and designs of the prior art, and in so doing provides an apparatus primarily developed for the purpose of providing an outdoor enthusiast with a quick and simple way to cook and grill foods over an open fire.

SUMMARY OF THE INVENTION

In view of the foregoing disadvantages inherent in the known types of portable outdoor cooker now present in the prior art, the present invention provides a new outdoor cooking apparatus construction wherein the same can be utilized for providing an outdoor enthusiast with a quick and simple way to cook and grill foods over an open fire.

The general purpose of the present invention, which will be described subsequently in greater detail, is to provide a new outdoor cooking apparatus which has many of the advantages of the portable outdoor cooker mentioned heretofore and many novel features that result in a new outdoor cooking apparatus which is not anticipated, rendered obvious, suggested, or even implied by any of the prior art portable outdoor cooker, either alone or in any combination thereof.

To attain this, the present invention generally comprises an elongate support assembly including a tubular member having a bore extending therethrough with elongate support assembly being adapted to penetrate a ground and to extend thereabove; and also includes a grill support assembly including a cable being adjustably extended through the bore of the tubular member; and further includes a grill assembly including a grill member being suspended above the ground by the cable.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new outdoor cooking apparatus which has many of the advantages of the portable outdoor cooker mentioned heretofore and many novel features that result in a new outdoor cooking apparatus which is not anticipated, rendered obvious, suggested, or even implied by any of the prior art portable outdoor cooker, either alone or in any combination thereof.

It is another object of the present invention to provide a new outdoor cooking apparatus which may be easily and efficiently manufactured and marketed.

It is a further object of the present invention to provide a new outdoor cooking apparatus which is of a durable and reliable construction.

An even further object of the present invention is to provide a new outdoor cooking apparatus which is susceptible of a low cost of manufacture with regard to both materials and labor, and which accordingly is then susceptible of low prices of sale to the consuming public, thereby making such outdoor cooking apparatus economically available to the buying public.

Still yet another object of the present invention is to provide a new outdoor cooking apparatus which provides in the apparatuses and methods of the prior art some of the advantages thereof, while simultaneously overcoming some of the disadvantages normally associated therewith.

Still another object of the present invention is to provide a new outdoor cooking apparatus for providing an outdoor enthusiast with a quick and simple way to cook and grill foods over an open fire.

Yet another object of the present invention is to provide a new outdoor cooking apparatus which includes an elongate support assembly including a tubular member having a bore extending therethrough with elongate support assembly being adapted to penetrate a ground and to extend thereabove; and also includes a grill support assembly including a cable being adjustably extended through the bore of the tubular member; and further includes a grill assembly including a grill member being suspended above the ground by the cable.

Still yet another object of the present invention is to provide a new outdoor cooking apparatus that easy and convenient to set up in minutes.

Even still another object of the present invention is to provide a new outdoor cooking apparatus that taken apart easily and quickly and is easily adjusted as to height.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
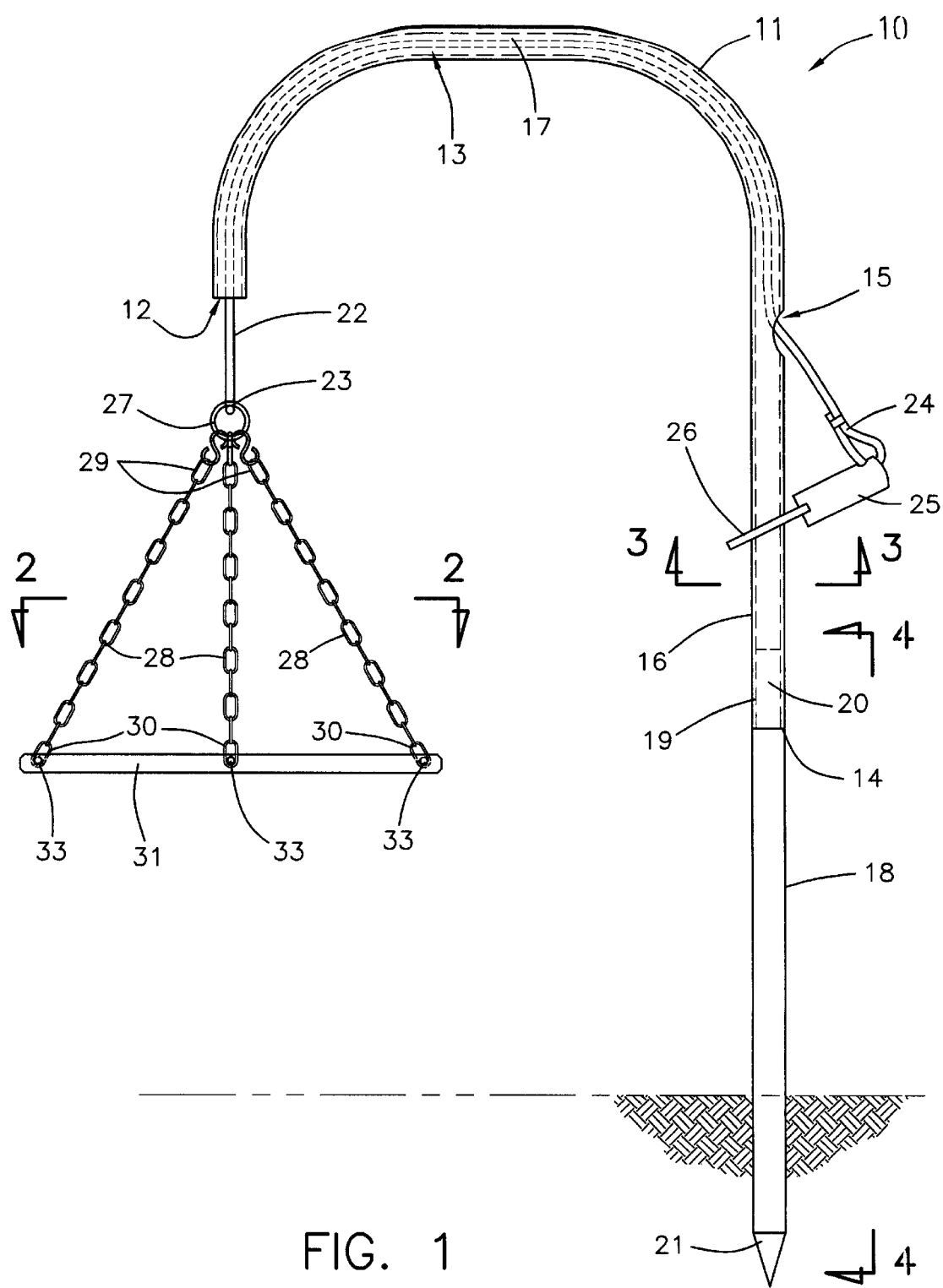
FIG. 1 is a side elevational view of a new outdoor cooking apparatus according to the present invention.
Figure 2:
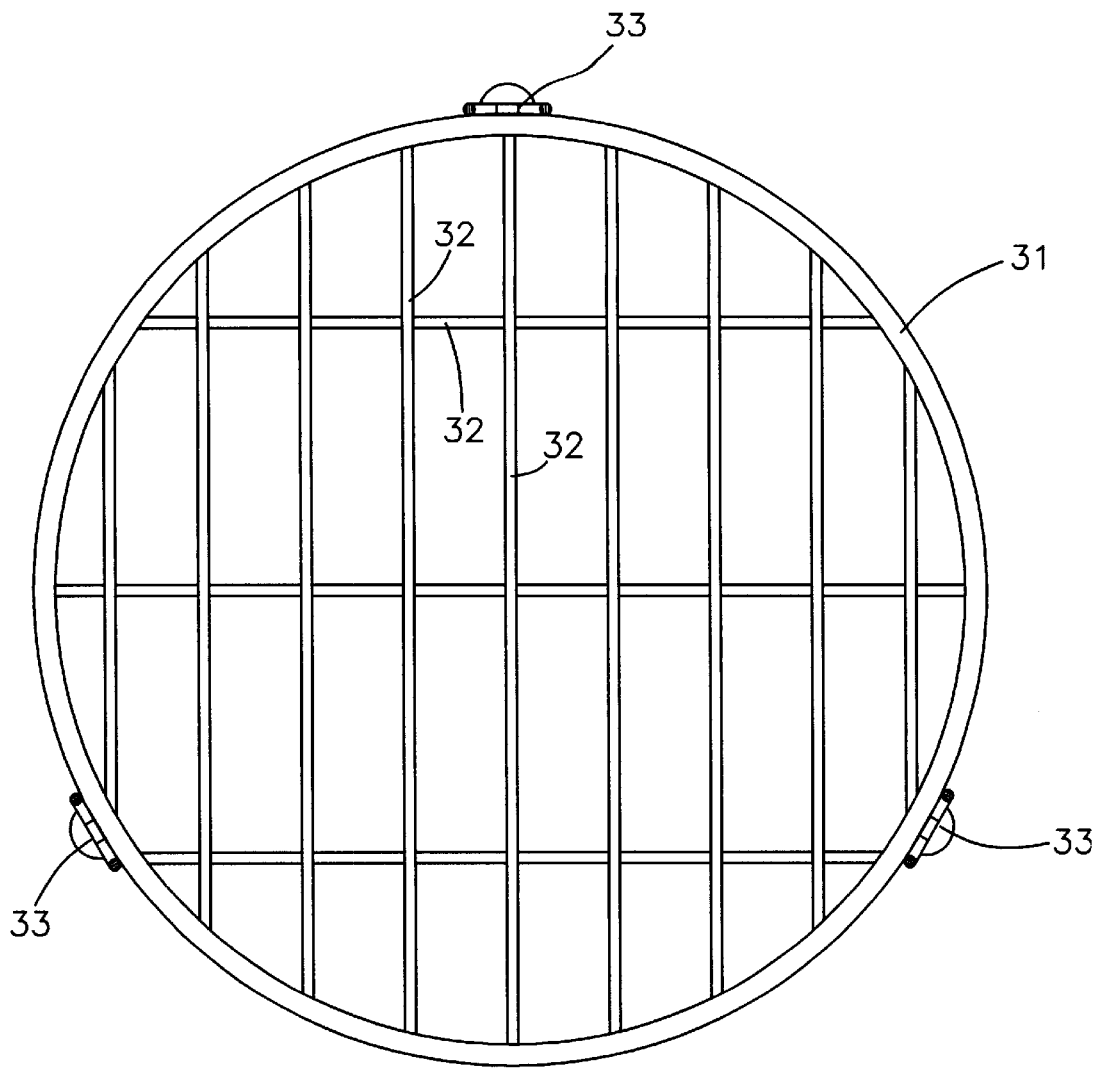
FIG. 2 is a top plan view of the grill member of the present invention.
Figure 3:
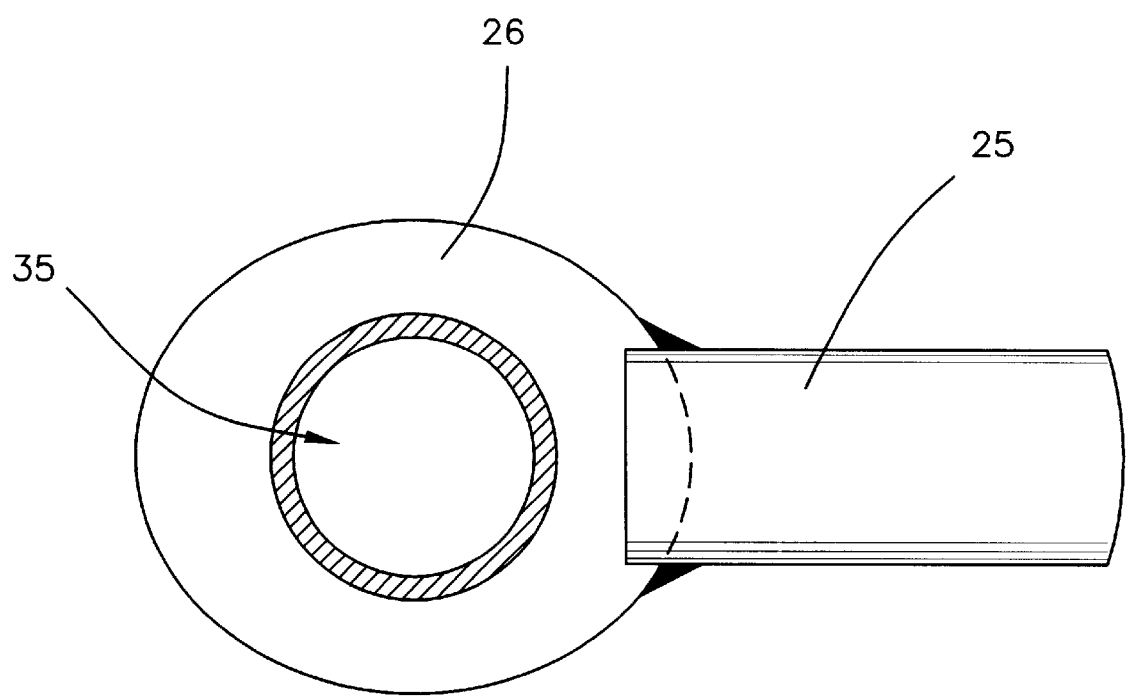
FIG. 3 is a cross-sectional view of the main portion of the elongate grill support member of the present invention.
Figure 4:
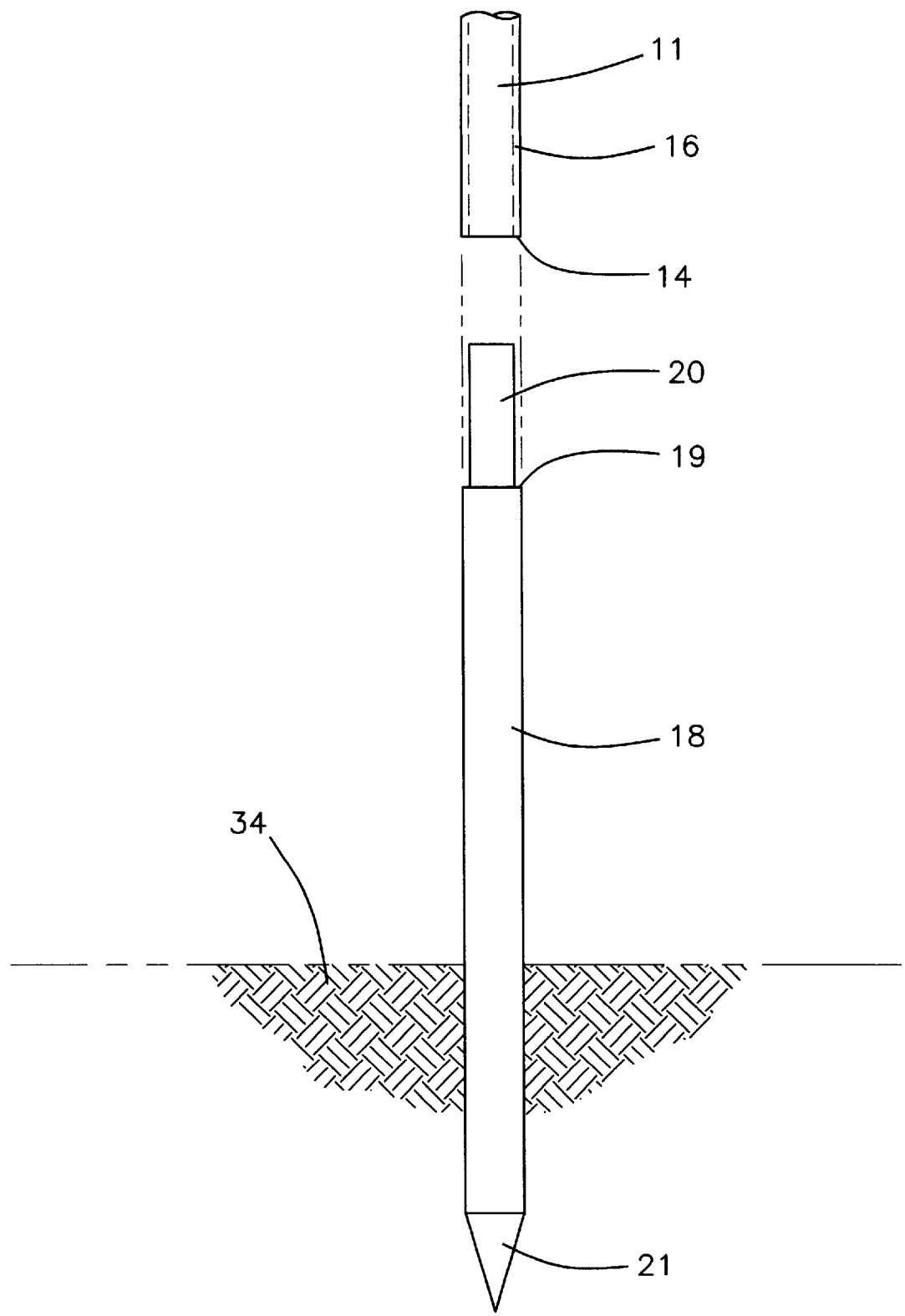
FIG. 4 is a side elevational view of the base portion of th tubular member and of the stake member of the present invention.
Figure 5:
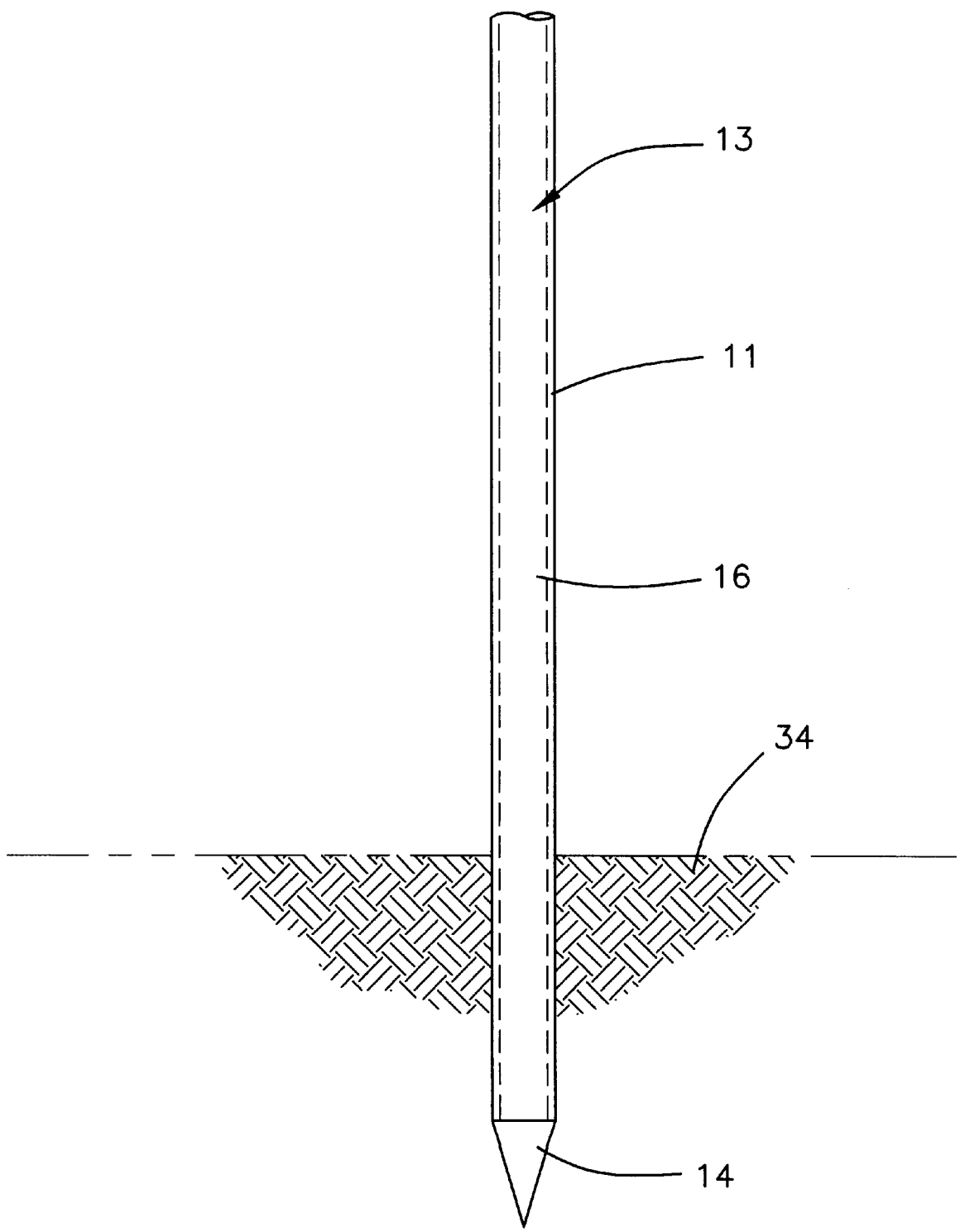
FIG. 5 is a side elevational view of a second embodiment of the base portion of the tubular member of the present invention.
Figure 6:
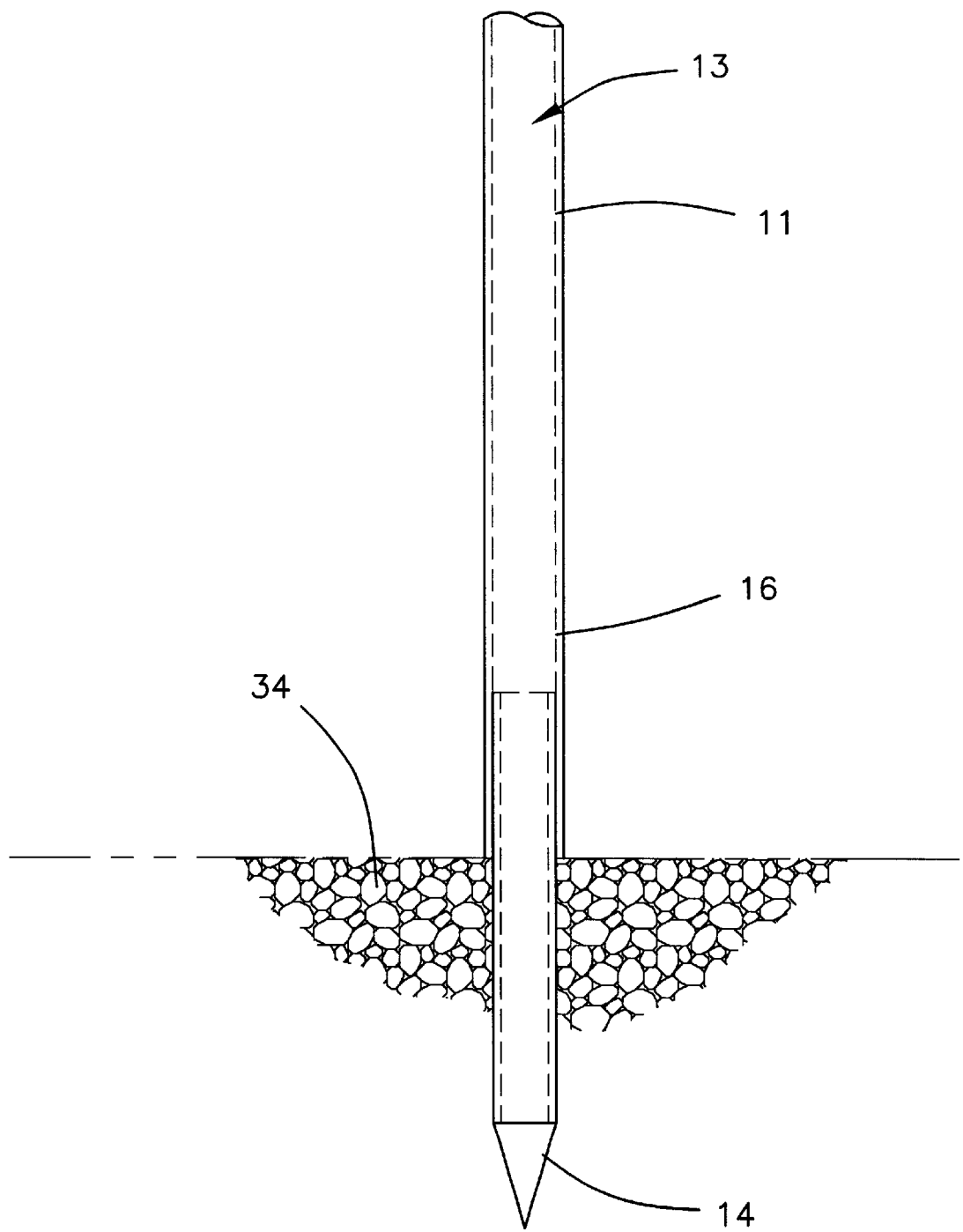
FIG. 6 is a side elevational view of another embodiment of the base portion of tubular member of the present invention.

With reference now to the drawings, and in particular to FIGS. 1 through 6 thereof, a new outdoor cooking apparatus embodying the principles and concepts of the present invention and generally designated by the reference numeral 10 will be described.

As best illustrated in FIGS. 1 through 6, the outdoor cooking apparatus 10 generally comprises an elongate support assembly including a tubular member 11 having a bore 13 extending therethrough and having an open first end 12. The elongate support assembly is adapted to penetrate a ground 34 and to extend thereabove with the tubular member 11 including a base portion 16 and a curved upper portion 17 and also including a hole 15 disposed through a wall of the tubular member 11 and into the bore 13.

A grill support assembly includes a cable 22 being adjustably extended through the bore 13 of the tubular member 11 with the cable 22 including a first end 23 and a second end portion 24 which is movably extended through the hole 1 5 in the tubular member 11. The grill support assembly further includes a handle assembly being securely and conventionally attached to the second end portion 24 of the cable 22. The handle assembly includes a handle member 25 having a first end and a second end which is securely and conventionally attached to the second end portion 24 of the cable 22. The handle assembly further includes a washer 26 having a hole 35 therein and being securely and conventionally attached on edge to the first end of the handle member 25 and being movably engaged about the base portion 16 of the tubular member 11. The grill support assembly also includes an eyelet 27 being securely and conventionally attached to the first end 23 of the cable 22, and further includes a plurality of chains 28 having first ends 30 and second ends 29 which are securely and conventionally attached to the eyelet 27. The grill assembly is removably attached to the first ends 30 of the chains 28. Each of the chains 28 has a length of approximately 15 inches with the cable 22 having a length of approximately 56 inches and with the hole 35 in the washer 26 having a diameter of approximately one inch.

A grill assembly includes a grill member 31 having grates 32 and being suspended above the ground 34 by the cable 22. The grill assembly also includes a plurality of spring-loaded clip members 33 being spaced along and securely and conventionally attached to a perimeter of the grill member 31. The spring-loaded clip members 33 are biasedly closed about the first ends 30 of the chains 28 with the grill member 31 having a diameter of approximately 22 inches.

As a first embodiment, the elongate support assembly also includes a stake member 18 having a male extended portion 20 integrally extending outwardly from a first end 19 thereof with the stake member 18 also having a tapered second end 21 which is adapted to penetrate into the ground 34 and with the tubular member 11 having an open second end 14 which is adapted to removably and securely receive the male extended portion 20 of the stake member 18.

As a second embodiment, the base portion 16 of the tubular member 11 has a tapered second end 14 which is adapted to penetrate into the ground 34.

In use, the user finds a suitable area to cook outdoors, and inserts the stake member 18 into the ground 34 and then attaches the tubular member 11 to the stake member 18 and attaches the grill member 31 to the chains 27. The user adjusts the height of the grill member 31 above the ground by moving the washer 26 along the length of the base portion 16 of the tubular member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An outdoor cooking apparatus comprising:

an elongate support assembly including a tubular member having a bore extending therethrough and having an open first end, said elongate support assembly being adapted to penetrate a ground and to extend thereabove;

a grill support assembly including a cable being adjustably extended through said bore of said tubular member; and a grill assembly including a grill member having grates and being suspended above the ground by said cable;

wherein said tubular member includes a base portion and a curved upper portion and also includes a hole disposed through a wall of said tubular member and into said bore;

wherein said cable includes a first end and a second end portion which is movably extended through said hole in said tubular member;

wherein said grill support assembly further includes a handle assembly being securely attached to said second end portion of said cable, said handle assembly including a handle member having a first end and a second end which is securely attached to said second end portion of said cable, said handle assembly further including a washer having a hole therein and being securely attached on edge to said first end of said handle member and being movably engaged about said base portion of said tubular member;

wherein said grill support assembly also includes an eyelet being securely attached to said first end of said cable, and further includes a plurality of chains having first ends and second ends which are securely attached to said eyelet, said grill assembly being removably attached to said first ends of said chains; and wherein said grill assembly also includes a plurality of spring-loaded clip members being spaced along and securely attached to a perimeter of said grill member, said spring-loaded clip members being biasedly closed about said first ends of said chains.

2. The outdoor cooking apparatus as described in claim 1, wherein said elongate support assembly also includes a stake member having a male extended portion extending outwardly from a first end thereof, said stake member also having a tapered second end which is adapted to penetrate into the ground, said tubular member having an open second end which is adapted to removably and securely receive said male extended portion of said stake member.

3. The outdoor cooking apparatus as described in claim 1, wherein said base portion of said tubular member has a tapered second end which is adapted to penetrate into the ground.

4. An outdoor cooking apparatus comprising:

an elongate support assembly including a tubular member having a bore extending therethrough and having an open first end, said elongate support assembly being adapted to penetrate a ground and to extend thereabove, said tubular member including a base portion and a curved upper portion and also including a hole disposed through a wall of said tubular member and into said bore;

a grill support assembly including a cable being adjustably extended through said bore of said tubular member, said cable including a first end and a second end portion which is movably extended through said hole in said tubular member, said grill support assembly further including a handle assembly being securely attached to said second end portion of said cable, said handle assembly including a handle member having a first end and a second end which is securely attached to said second end portion of said cable, said handle assembly further including a washer having hole therein and being securely attached on edge to said first end of said handle member and being movably engaged about said base portion of said tubular member, said grill support assembly also including an eyelet being securely attached to said first end of said cable, and further including a plurality of chains having first ends and second ends which are securely attached to said eyelet, said grill assembly being removably attached to said first ends of said chains, each of said chains having a length of approximately 15 inches, said cable having a length of approximately 56 inches, said hole in said washer having a diameter of approximately one inch; and a grill assembly including a grill member having grates and being suspended above the ground by said cable, said grill assembly also including a plurality of spring-loaded clip members being spaced along and securely attached to a perimeter of said grill member, said spring-loaded clip members being biasedly closed about said first ends of said chains, said grill member having a diameter of approximately 22 inches.

5. The outdoor cooking apparatus as described in claim 4, wherein said elongate support assembly also includes a stake member having a male extended portion extending outwardly from a first end thereof, said stake member also having a tapered second end which is adapted to penetrate into the ground, said tubular member having an open second end which is adapted to removably and securely receive said male extended portion of said stake member.

6. The outdoor cooking apparatus as described in claim 4, wherein said base portion of said tubular member has a tapered second end which is adapted to penetrate into the ground.

* * * * *